US012782245B2

(12) United States Patent
Pujol et al.

(10) Patent No.: US 12,782,245 B2
(45) Date of Patent: Nov. 3, 2026

(54) SYSTEM AND METHOD FOR SUBSAMPLING A GASEOUS SUBSAMPLE FROM A MONOPHASIC FLUID FOR NOBLE GAS ANALYSIS

(71) Applicant: TOTALENERGIES ONETECH, Courbevoie (FR)

(72) Inventors: Magali Pujol, Pau (FR); James Alexander Scott, Pau (FR); Jérôme Pauly, Pau (FR)

(73) Assignee: TOTALENERGIES ONETECH, Courbevoie (FR)

( * ) Notice: Subject to any disclaimer, the term of this patent is extended or adjusted under 35 U.S.C. 154(b) by 659 days.

(21) Appl. No.: 18/268,668

(22) PCT Filed: Dec. 21, 2021

(86) PCT No.: PCT/EP2021/087166
§ 371 (c)(1),
(2) Date: Jun. 21, 2023

(87) PCT Pub. No.: WO2022/136478
PCT Pub. Date: Jun. 30, 2022

(65) Prior Publication Data
US 2025/0231089 A1 Jul. 17, 2025

(30) Foreign Application Priority Data
Dec. 22, 2020 (EP) .................................... 20306665

(51) Int. Cl.
*G01N 1/10* (2006.01)
*G01N 1/22* (2006.01)

(52) U.S. Cl.
CPC ............ *G01N 1/10* (2013.01); *G01N 1/2247* (2013.01); *G01N 2001/1062* (2013.01); *G01N 2001/2267* (2013.01)

(58) Field of Classification Search
CPC .................. G01N 1/10; G01N 1/2247; G01N 2001/1062; G01N 2001/2267; G01N 1/2294
See application file for complete search history.

(56) References Cited

U.S. PATENT DOCUMENTS 4,699,886 A * 10/1987 Lelong .............. G01N 33/0044 436/60
5,536,474 A * 7/1996 Ungerer .................. G01N 1/10 422/522
(Continued)

FOREIGN PATENT DOCUMENTS

EP 0473472 3/1992
GB 2276608 10/1994
(Continued)

OTHER PUBLICATIONS

International Search Report and Written Opinion for PCT/EP2021/087166, dated Feb. 8, 2022, 8 pages.

*Primary Examiner* — Jennifer Wecker
*Assistant Examiner* — Britney N. Washington
(74) *Attorney, Agent, or Firm* — Tucker Ellis LLP

(57) ABSTRACT

The invention relates to a subsampling system or method of a monophasic fluid (2) for the preparation of a gaseous subsample (**2*b*), said subsampling system (1) comprising: a first inlet valve (11), an expandable cell (20), a second valve (41), and an expansion cell (40); said first inlet valve (11) being arranged so as to control the flow of the monophasic fluid to the expandable cell (20); said expandable cell (20) being arranged to allow the expansion of the monophasic fluid (2) until forming a diphasic fluid (2*a*) at a known pressure, volume and temperature, said diphasic fluid (2*a*) comprising a gas phase and a liquid phase; said second valve (41) being arranged so as to control the flow of the gas phase to the expansion cell (40); and said expansion cell (40**) being
(Continued)

arranged so as to contain the gaseous subsample (2*b*) of the monophasic fluid (2).

16 Claims, 7 Drawing Sheets

(56) References Cited

U.S. PATENT DOCUMENTS

| | | | | |
|---|---|---|---|---|
| 6,257,070 | B1 * | 7/2001 | Giallorenzo | G01F 15/08<br>73/861.04 |
| 2010/0281950 | A1 * | 11/2010 | Weres | G01N 1/10<br>73/31.07 |
| 2021/0379553 | A1 * | 12/2021 | Kirchmann | G01N 1/2226 |

FOREIGN PATENT DOCUMENTS

| | | |
|---|---|---|
| GB | 2278830 | 12/1994 |
| WO | 2013148442 | 10/2013 |
| WO | 2015078972 | 6/2015 |

* cited by examiner

SYSTEM AND METHOD FOR SUBSAMPLING A GASEOUS SUBSAMPLE FROM A MONOPHASIC FLUID FOR NOBLE GAS ANALYSIS

FIELD OF THE INVENTION

The present invention relates to the field of chemical analysis. In particular, the invention relates to the preparation of samples for chemical analysis. This invention provides a new subsampling method and system for the preparation of a gaseous subsample from a monophasic fluid. The invention is particularly adapted to the preparation of a subsample for the analysis of noble gas abundances.

DESCRIPTION OF RELATED ART

Noble gases, namely helium (He), neon (Ne), argon (Ar), krypton (Kr), and xenon (Xe), have proven to be powerful tools to better understand many geological processes due to their properties of low abundance and chemical inertness. For example, noble gas studies play an important role in investigating earthquakes and volcanic activity, as well as for reconstructing paleoclimate conditions and interpreting ocean circulation histories. Noble gases are unaffected by inorganic or organic chemical reactions and only sensitive to physical processes. As noble gas are present under trace in all fluids and minerals, it makes them ideal tracers for investigating the origin and evolution of subsurface fluids, whatever water, oil and/or gas systems.

In particular, noble gases in fluids are derived from three main sources, which are the atmosphere, crust, and mantle. The presence of noble gases in fluids and their relative abundances can provide new insights into surface or subsurface fluid evolution (e.g., fluid origins, fluid flow paths, fluid circulation, and fluid contamination).

In particular, the noble gas elemental and isotope compositions in crustal fluids are critical for the understanding of the interactions among various crustal subsurface fluids (water, oil and gas). For example, since the hydrocarbon phase is depleted in atmospheric noble gases, the measured atmospheric noble gases in oil and gas reservoirs can result from the interactions between groundwater and the hydrocarbon system. Regarding reservoir characterization, it has been proposed to measure concentrations and isotopic ratios of noble gases present in a seep sample, which are measured and compared to a concentration of the formation water. Such a comparison allows the determination of a type, quality, hydrocarbon/water volume ratio, and/or volume of hydrocarbons associated with the subsurface accumulation (WO2013148442). In another example, noble gas isotopes are powerful tracers of subsurface fluid provenance and can be used to understand the impact of enhanced oil recovery on hydrocarbon systems and potentially overlying aquifers.

Recent studies reconstructed the noble gas composition of the oil phase from casing gas measurements using broad assumptions about gas solubility in oil (e.g., Barry et al., 2018a, Tracing enhanced oil recovery signatures in casing gases using noble gases. *Earth Planet. Sci. Lett.* 496, 57-67; Barry et al., 2018b, Noble gases in deep-water oils of the U.S. *Gulf of* Mexico. Geochem. Geophys. Geosyst. 19 (11), 4218-4235). Noble gases measurement requires a gas mass spectrometer combined with an extraction/purification line. For good quality results, the role of the purification line is to remove all molecules that are not a noble gas. To do so mainly chemical traps are used. Therefore, having fewer molecules in the sample decreases the sample purification time and efficiency. Moreover, the purification line (outside chemical traps) is regularly baked and pumped under high vacuum to remove residual pollution.

Generally, to minimize these problems, only gas samples (e.g., no heavy compounds that condense in the purification line), at a relatively low pressure (to limit the number of molecules to be purified), are run on a noble gas mass spectrometry system.

Because the abundances of some noble gases are extremely low in the natural environment, any contact with the surrounding air will significantly prevent for any interpretation. Therefore, noble gas sampling system should avoid any air pollution.

At present, there are no reliable published methods for accurately determining the noble gas signature of a monophasic liquid sampled. Resolving the noble gas signature of a monophasic liquid poses an array of problems. Unlike gas, it is not possible to simply introduce a liquid into a noble gas mass spectrometer. Once introduced into a mass spectrometer the compounds and other elements that make up the fluid act as a contaminant, reducing the reliability and precision of the equipment and measures provided by said equipment. Thus, a series of methods have been devised to sample noble gas from a monophasic fluid prior to being introduced in a noble gas mass spectrometer. However, these methods have a series of flaws, 1) typically the sampling procedure produces an unrepresentative sample, 2) some authors wrongly assume all noble gases partition in the gas phase and; 3) the published equations for back calculating the original signature of the fluid are too simplistic.

Typically, studies measure the composition of the gas that has degassed a monophasic fluid (outlined in Holland and Gilfillan, 2013, Application of noble gases to the viability of CO2 storage. In *The noble gases as geochemical tracers* (*pp.* 177-223). Springer, Berlin, Heidelberg & Ballentine et al., 1996, A Magnus opus: Helium, neon, and argon isotopes in a North Sea oilfield. *Geochimica et Cosmochimica Acta,* 60 (5), 831-849). However, there are two main issues with these methods, 1) Many studies wrongly assume that when a gas ex solves from a fluid all of the noble gases will partition into the gas phase and 2) the PVT (pressure, volume, temperature) conditions during sample collection are poorly constrained (Tyne et al., 2019, Tracing the Fate of Injected CO2 using Noble Gas Isotopes. In *AGU Fall Meeting* 2019. AGU). The results obtained are often from highly fractionated samples. In addition to the flawed sampling method, the equation used for recalculating the original composition is over simplified (Ballentine et al., 1996).

Indeed, regarding the partition of the noble gases into the gas phase, the non-ideality is associated with several parameters, such as pressure, temperature and composition of each phase. Hence, noble gases in a binary phase system will partition in their individual way in order to reach equilibrium. Thus, even a modified Henry's law will not be sufficient to describe the noble gases non-ideal behaviour in the gas and fluid phases accurately.

Therefore, there is an urgent need for new sampling methods and/or analysis methods of a monophasic liquid that allow extracting unbiased abundance values.

SUMMARY OF THE INVENTION

The following sets forth a simplified summary of selected aspects, embodiments and examples of the present invention for the purpose of providing a basic understanding of the invention. However, the summary does not constitute an extensive overview of all the aspects, embodiments and examples of the invention. The sole purpose of the summary is to present selected aspects, embodiments and examples of the invention in a concise form as an introduction to the more detailed description of the aspects, embodiments and examples of the invention that follow the summary.

The invention aims to overcome the disadvantages of the prior art. In particular, the invention proposes a subsampling method and system, said method or system allowing the preparation of a gaseous subsample from a monophasic fluid that can be used for example for the noble gas abundance analysis. In particular, the pressure, volume and temperature conditions are fully controlled when the monophasic fluid is transformed in a diphasic fluid (i.e., bubble point pressure, PV curve). By knowing the precise condition when the bubble point occurred, it is possible to accurately calculate the original noble gas signature of the monophasic fluid. In particular, monophasic liquid samples, a split of the sample in diphasic domain under equilibrium and under controlled conditions of pressure and temperature enable an analyze dedicated to the gas phase to rebuild the initial fluid composition. Hence, according to an aspect of the present invention, it is provided a subsampling system of a monophasic fluid for the preparation of a gaseous subsample, said subsampling system comprising:

- a first inlet valve,
- an expandable cell,
- a second valve, and
- an expansion cell;

said first inlet valve being arranged so as to receive the monophasic fluid, for example from a sampling bottle, and to control the flow of the monophasic fluid to the expandable cell;

said expandable cell being thermoregulated, equipped with a pressure gauge and arranged to allow the expansion of the monophasic fluid until forming a diphasic fluid at a known pressure, volume and temperature, said diphasic fluid comprising a gas phase and a liquid phase;

said second valve being arranged so as to control the flow of the gas phase to the expansion cell; and said expansion cell being arranged so as to receive at least a part of the gas phase, said at least a part of the gas phase forming the gaseous subsample of the monophasic fluid, preferably, the subsampling system being arranged to allow a measurement of the temperature inside the expandable cell.

A system according to the invention allows the collection of an aliquot of a monophasic fluid. Such an aliquot is subject to pressure variation in the expandable cell until a bubble point occurs, the monophasic fluid becoming a diphasic fluid made of a liquid phase and a gas phase.

An equilibrium will be reached between the liquid phase and the gas phase, usually in minutes to hours, and chemical content such as noble gas will reach a partition scheme between the liquid phase and the gas phase. The monophasic fluid in the monophasic fluid source will thus stay under pressure, volume, temperature control whereas the aliquot will be transformed in a diphasic fluid.

The temperature and pressure will be measured until the equilibrium is reached. Hence, the invention allows a phase split under controlled conditions in order to recombine the initial chemical content such as noble gas content of the initial monophasic fluid.

Moreover, a system according to the invention allows the preparation of representative samples of the monophasic fluid which are not fractionated. All steps are well constrained and the conditions of sampling are controlled and recorded; This allows a true determination of chemical content such as noble gas fingerprint of a monophasic fluid.

According to other optional features of the subsampling system, it can optionally include one or more of the following characteristics alone or in combination:

- it is arranged to allow a measurement of the pressure inside the expandable cell and to control the inner volume and temperature of the expandable cell.
- it is arranged to allow a measurement of the temperature inside the expandable cell. In particular, the subsampling system further comprises a temperature controller, preferably an electronic temperature controller, an electronic pressure monitor, and a volume controller, preferably electronic volume controller, respectively configured to determine the temperature value, the pressure value and the volume value of the expandable cell when the bubble point occurs.
- the expansion cell is a high-pressure expansion cell. For example, such an expansion cell can be designed to support pressure up to 800 bar and lower than $10^{-6}$ mbar. The system is particularly designed to subsample a high-pressure monophasic fluid which can have a pressure up to 1000 bar. Preferably, it should also as withstand a pressure down to $10^{-7}$ mbar when under pumping.
- the whole subsampling system is thermoregulated. Such thermoregulation enhances the accuracy of the measurements thanks to a better subsampling.
- It comprises at least one three-way valve and a draining point, said three-way valve being connected to the draining point and positioned right before and/or right after the expandable cell. Such a draining point allows removing the liquid part of the diphasic sample and, after that, if necessary, connecting it to the pumping system to allow a recharge of the monophasic fluid in order to cumulate the gas after the expansion cell.
- the second valve is positioned between the three-way valve and the expansion cell.
- It comprises a low-pressure section arranged to allow the gas pressure to reach a target pressure, preferably said target pressure being selected from 1 to 10 bars. Such a section is usually not included as the samples are directly subsampled at low pressure.
- It comprises at least one, preferably two, subsampling cells removably fixed to the subsampling system and arranged so as to collect at least a part of the gaseous subsample at a pressure comprised between 1 bar and 10 bars. Several subsampling cells allow several samplings but more importantly pressure reduction in combination with the draining point and the expansion cell.
- the low-pressure section comprises the at least one preferably two, subsampling cells.
- It comprises a temperature controller for temperature control of the expandable cell, preferably said temperature controller is configured to maintain a temperature of 40° C. to 60° C. in the expandable cell. This facilitates the back computation of the chemical composition of the monophasic fluid. For example, the temperature controller is configured to maintain a temperature of 40° C. to 60° C. in the expandable cell.
- It comprises a volume controller for increasing or decreasing the volume of the expandable cell. A manual or electronic volume controller can be used to control the volume for example according to the pressure measured in the expandable cell. For example, the volume controller is further configured to increase or decrease the volume of the expandable cell.

the expandable cell is equipped with a movable inner surface such as a piston, said movable inner surface being arranged to increase or decrease the volume of the expandable cell. This movable inner surface can preferably be moved through an actionable piston or valve. With the use of a movable inner surface, it will be possible to obtain a more precise determination of the conditions of the phase split in order to recombine a more precise initial chemical content such as noble gas content of the initial monophasic fluid.

the expandable cell is a high-pressure expandable cell, preferably, the expandable cell is a high-pressure syringe. As discussed, the monophasic fluid is a high-pressure fluid and thus the expandable cell is preferably arranged to sustain pressure between $10^{-6}$ mbar and 800 bar, preferably between 107 mbar and 1000 bar. For example, the expandable cell should be designed to support pressure higher than 800 bar and lower than $10^{-6}$ mbar. The system is particularly designed to subsample a high-pressure monophasic fluid which can have a pressure up to 1000 bar. In particular, the expandable cell should support high pressure during the sampling when charged with the monophasic fluid, such as pressure higher than 1000 bar. Preferably, it should also as withstand a pressure down to $10^{-7}$ mbar when under pumping.

the first inlet valve is arranged so as to allow a withdrawal of an aliquot of the monophasic fluid from the sampling bottle.

It comprises an observation cell, preferably a sapphire cell, positioned between the expandable cell and the expansion cell. Hence, it will be possible to observe automatically or manually if a liquid drop is transferred into the expansion cell.

The second valve is positioned between the three-way valve and the expansion cell.

it comprises at least a turbomolecular pumping system, preferably combined with a primary pumping system, configured to allow subsampling under high vacuum conditions.

According to another aspect of the invention, it is provided a method of subsampling a monophasic fluid, for the preparation of a gaseous subsample using a subsampling system comprising a first inlet valve, an expandable cell, a second valve, and an expansion cell; preferably, the subsampling system being arranged to allow a measurement of the temperature inside the expandable cell, said subsampling method comprising:

Connecting a monophasic fluid source to the subsampling system so that the first inlet valve of said subsampling system receives the monophasic fluid and control monophasic fluid flow to the expandable cell;

Operating the first inlet valve so that the expandable cell receives, through the first inlet valve, at least a fraction of the monophasic fluid;

Expanding the expandable cell, at a known pressure, volume and temperature, until the monophasic fluid is transformed into a diphasic fluid, said diphasic fluid comprising a gas phase and a liquid phase;

Operating the second valve, said second valve controlling the gas phase flow to the expansion cell, so as to transfer only the gas phase from the expandable cell to the expansion cell; and Sampling at least a part of the gas phase comprised in the expansion cell to obtain the gaseous subsample, preferably for a noble gas analysis.

Such a method allows the subsampling of noble gases from a monophasic fluid, where the pressure, volume and temperature conditions are known and preferably volume and temperature are controlled. By knowing the precise condition in which the bubble point occurred, and the fluid properties it is possible to accurately calculate the original noble gas signature of the monophasic fluid.

This method is particularly relevant for all noble gas studies that use monophasic liquids.

According to other optional features of the subsampling method, it can optionally include one or more of the following characteristics alone or in combination:

the gaseous subsample is brought to a pressure of less than 10 bar. Indeed, while the monophasic fluid to be subsampled having a high pressure (for example higher than 100 bar), the gaseous subsample should be brought at a pressure below 10 bar.

it further comprises cleaning steps of the subsampling system.

It further comprises purifying the gaseous subsample.

It further includes a way, through the draining point, to remove the liquid part, to pump only the expandable cell and to recharge it with the monophasic fluid in order to cumulate the gas in the expansion cell, in particular when there is not enough gas during a single charge to reach a pressure between 1 and 10 bars after the monophasic fluid is transformed into a diphasic fluid.

The subsampling system comprises an observation cell, and the subsampling method also comprises a step of operating the second valve until a liquid is observed through the observation cell so as to transfer only the gas phase from the expandable cell to the expansion cell. Alternatively, only the gas phase can be transferred from the expandable cell to the expansion cell by monitoring the pressure in expandable cell. For example, when fluid properties are known (at least Gas Oil Ratio), and when the monophasic liquid is injected, any small increase of volume will generate an important decrease of pressure until the bubble point pressure is reached. Then, when the fluid is diphasic, the pressure barely decreases for an important increase of volume. At this point, it is fairly certain that most of the expandable cell volume is occupied by the gas phase, and a part of it can be safely transferred into the expansion cell. An observation cell will be preferred to transfer 100% of the gas volume.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION

Figure 1:
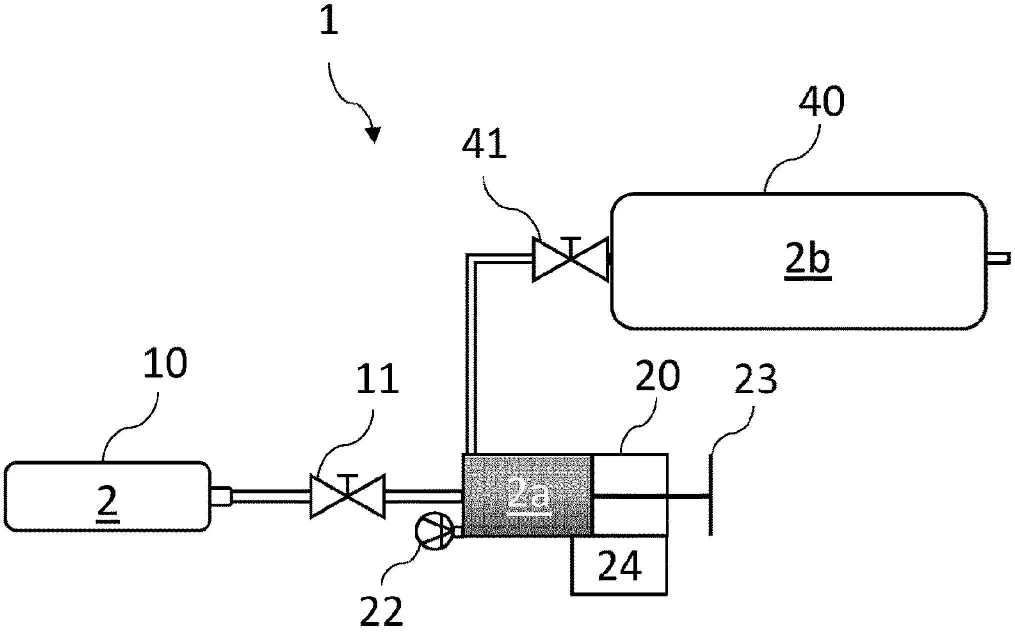
FIG. 1 is a schematic view showing an embodiment of a subsampling system of a monophasic fluid according to the invention.

A description of example embodiments of the invention follows.

In the following description, "Subsampling" means or implies a procedure by which a smaller, representative sample is taken from a larger sample.

In the following description, "a monophasic fluid" corresponds to a particular state of a fluid having one phase which is liquid form or gas form, or supercritical form. Preferably, "a monophasic fluid" corresponds to a state of a fluid having one phase which is liquid form.

In the following description, "gaseous subsample" is about collecting a fraction of a sample in a gas form In the following description, "low-pressure section" means a section of a subsampling system configured to an operating pressure of less than 20 bar.

In the following description, "high-pressure" means a pressure higher than 20 bar, a "high-pressure section" means a section of a subsampling system configured to an operating pressure of more than 20 bar.

In the following description, "noble gases" refers to a series of chemically inert elements that exhibit similar properties. The noble gases are a group of chemically inert, or conservative, gases which have a low natural abundance in natural fluids. Various physical processes have resulted in different pools of noble gases (the mantle, atmospheric and crustal pools) becoming distinct in their isotopic composition and relative elemental abundances. The five noble gases of particular interest in the present invention are helium (He), neon (Ne), argon (Ar), krypton (Kr) and xenon (Xe).

By "process", "compute", "determine", "display", "extract", "compare" or more broadly "executable operation" is meant, within the meaning of the invention, an action performed by a computer device or a processor unless the context indicates otherwise. In this regard, the operations relate to actions and/or processes of a data processing system, for example a computer system or an electronic computing device, which manipulates and transforms the data represented as physical (electronic) quantities in the memories of the computer system or other devices for storing, transmitting or displaying information. In particular, calculation operations are carried out by the processor of the device, the produced data are entered in a corresponding field in a data memory and this field or these fields can be returned to a user for example through a Human-Machine Interface formatting such data. These operations may be based on applications or software.

The terms or expressions "application", "software", "program code", and "executable code" mean any expression, code or notation, of a set of instructions intended to cause a data processing to perform a particular function directly or indirectly (for example after a conversion operation into another code). Exemplary program codes may include, but are not limited to, a subprogram, a function, an executable application, a source code, an object code, a library and/or any other sequence of instructions designed for being performed on a computer system.

By "processor" is meant, within the meaning of the invention, at least one hardware circuit configured to perform operations according to instructions contained in a code. The hardware circuit may be an integrated circuit. Examples of a processor include, but are not limited to, a central processing unit, a graphics processor, an application-specific integrated circuit ("ASIC" according to Anglo-Saxon terminology), and a programmable logic circuit. A single processor or several other units may be used to implement the invention.

By "coupled" is meant, within the meaning of the invention, connected, directly or indirectly, with one or more intermediate elements. Two elements may be coupled mechanically, electrically or linked by a communication channel.

The expression "human-machine interface", within the meaning of the invention, corresponds to any element allowing a human being to communicate with a computer, in particular and without that list being exhaustive, a keyboard and means allowing in response to the commands entered on the keyboard to perform displays and optionally to select with the mouse or a touchpad items displayed on the screen. Another embodiment is a touch screen for selecting directly on the screen the elements touched by the finger or an object and optionally with the possibility of displaying a virtual keyboard.

By "computer device", it should be understood any device comprising a processing unit or a processor, for example in the form of a microcontroller cooperating with a data memory, possibly a program memory, said memories possibly being dissociated. The processing unit cooperates with said memories by means of internal communication bus.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements.

Additionally, it should be understood that references to "one embodiment" or "an embodiment" of the present disclosure are not intended to be interpreted as excluding the existence of additional embodiments that also incorporate the recited features.

Chemical elements can partition differently between phases. Hence the analysis of a monophasic fluid sampled in extreme environment (i.e., pressure more than 20 bar or temperature >100° C.) can be biased when the subsampling is not correctly done. To calculate the concentration of chemical elements, such as noble gas, in each phase at the time of sampling, several approximations are usually done, this leading to inaccurate results.

In particular, PVT sampling bottles, containing a complex fluid, are used through a pressure decrease to create gaseous samples. However, such a generation of gaseous samples, when it is done without any parameter control, lead to a degradation of the content of the sampling bottle and show a low reproduction rate.

The inventors developed a new solution for isolating chemical elements, in particular noble gases, from complex fluids such as fluids containing water-gas-oil mixtures. The solution can be described as an offline extraction system configured to isolate a gaseous subsample from a high-pressure monophasic fluid.

The invention thus relates to a method or system for obtaining a representative noble gas sample from a monophasic sample, where the precise pressure, volume and temperature conditions are known or controlled, allowing for the calculation of the original noble gas composition in a monophasic fluid.

The detailed description focuses only on the description of a pressurized liquid subsampling for noble gas analysis. However, this invention can be applied to other monophasic fluids requiring a phase split under controlled conditions to be able to recombine the initial chemical (e.g., noble gas) content of the initial liquid fluid.

According to a first aspect, the invention relates to a subsampling system 1 of a monophasic fluid 2.

Such a subsampling system 1 is particularly relevant for the preparation of a gaseous subsample 2*b* from the monophasic fluid 2, said gaseous subsample being adapted to noble gas analysis.

As shown in FIG. 1, the subsampling system 1 comprises a first inlet valve 11, an expandable cell 20, a second valve 41, and an expansion cell 40.

As it will be described hereafter, this subsampling system 1 can be used under various arrangements.

Essentially, this subsampling system 1 will comprise two main parts: a phase split part and a low-pressure part.

The split part will in particular comprise the first inlet valve 11 and the expandable cell 20. This split part is configured to induce a phase split in the monophasic fluid 2 under highly controlled conditions. Indeed, the phase split is preferably monitored through temperature, volume, and pressure measurements.

The low-pressure part will in particular comprise the expansion cell 40. This low-pressure part is configured to induce an expansion of the gaseous subsample and thus to reduce the pressure of this gaseous subsample under controlled conditions (e.g., a defined volume of the expansion cell 40).

Each element of the subsampling system 1 will be described in detail and some the preferred embodiments will be illustrated.

First Inlet Valve 11

The first inlet valve 11 is preferably arranged so as to receive the monophasic fluid 2. For example, the monophasic fluid 2 can be received through the first inlet valve 11 from a sampling bottle 10. In particular, the first inlet valve 11 is adapted to be connected to a PVT (Pressure, Volume, Temperature) sampling bottle.

Indeed, the invention relates to the subsampling of a gaseous phase of a monophasic fluid 2 sampled in an extreme environment such as a high-pressure environment. In order to keep the distribution of species unperturbed, the monophasic fluid 2 is preferably maintained in a controlled environment reflecting the initial sampling conditions.

The first inlet valve 11 is preferably configured to control the flow of the monophasic fluid 2 from the sampling bottle 10 to the expandable cell 20.

Advantageously, the first inlet valve 11 is arranged to take a very low volume sample from the monophasic fluid source. Preferably, the system is arranged so that the first inlet valve 11 is capable of transferring an aliquot of less than 10 cc from the monophasic fluid source, preferably less than 5 cc, more preferably less than 1 cc.

The first inlet valve 11 can be a two-way or a three-way inlet valve. It can be selected from automated or manual valves. For example, the use of pneumatically actuated inlet valves enables full automation of subsample preparation and eventually post-analysis clean up.

Preferably, the first inlet valve 11 has to be designed to support a pressure ranging from $10^{-7}$ mbar to 1000 bars.

Expandable Cell 20

As illustrated in the FIG. 1, the subsampling system 1 according to the invention also comprises an expandable cell 20.

Advantageously, the expandable cell 20 is thermoregulated and the pressure in the expandable cell 20 is monitored.

Moreover, the expandable cell 20 has the particularity to be arranged to allow a controlled and variable expansion of the monophasic fluid 2.

The controlled and variable expansion of this expandable cell 20, in particular of its inner volume, can be managed through various ways, for example using a movable inner surface like a movable piston or a movable wall such as in a syringe cell. For example, a movable inner surface that can be moved through the use of a fluid controlled by one or several valves. For example, the expandable cell can be composed of different chambers separated with valves and the expansion is controlled by the connection of the initial volume to additional volumes of supplementary chambers.

In particular, the expandable cell 20 can be equipped with at least one movable surface such as a piston 23, preferably said piston 23 being arranged to increase or decrease the volume of the expandable cell 20.

The expandable cell 20 will be preferably calibrated. The calibration will ensure that the precise inner volume of the expandable cell 20 will be known in a range of at least 5 cc, preferably 30 cc, more preferably 200 cc. For example, the inner volume of the expandable cell 20 can be known continuously from a 1 cc volume to a 200 cc volume.

Moreover, the system can comprise a volume controller 24. The volume controller may be an electronic volume controller configured to control the increasing or decreasing of the volume of the expandable cell 20. Such control can be carried out through a human-machine interface. Alternatively, the system can comprise a manual volume controller 24 configured to control the increasing or decreasing of the volume of the expandable cell 20.

Such an expansion is preferably possible until the monophasic fluid 2 forms a diphasic fluid 2*a*. The said diphasic fluid 2*a* comprising a gas phase and a liquid phase.

Hence, as it has already been discussed, the subsampling system 1 according to the invention is configured to make an expansion of the monophasic fluid 2 at a controlled:

volume,
pressure and
temperature.

The volume of the expandable cell 20 can be measured based on the displacement value(s) of movable(s) part(s) of the expandable cell 20. In particular, volume measurement means can be connected to electronic volume monitor configured to determine the volume value of the expandable cell 20 when the bubble point occurs.

The pressure in the expandable cell 20 can be monitored for example through the pressure gauge 22 or any other means adapted for pressure measurement in the expandable cell 20. For example, a baratron® manometer can be fitted in a part of the expandable cell 20 and is preferably capable of measuring from 20 mTorr to 10000 Torr.

In particular, pressure measurement means can be connected to electronic pressure monitor configured to determine the pressure value of the expandable cell 20 when the bubble point occurs.

The temperature in the expandable cell 20 can be monitored for example through the temperature sensor or temperature gauge or any other means adapted for temperature measurement in the expandable cell 20. In particular, the temperature in the expandable cell 20 can be monitored directly (e.g. in the expandable cell) or indirectly (e.g. through an external temperature measurement) by the measurement means.

For example, the expandable cell can be put in a closed volume with a controlled temperature (e.g. an oven). For example, the expandable temperature can be surrounded by a heating mat or heating cable.

In particular, temperature measurement means can be connected to an electronic temperature controller 70 configured to determine the temperature value of the expandable cell 20 when the bubble point occurs.

Moreover, the system can comprise a temperature controller configured to monitor and control the sample temperature in the expandable cell 20.

Preferably, the subsampling system 1 according to the invention comprises an expandable cell 20 which is arranged to allow the expansion of the monophasic fluid 2 to form, at a bubble point, a diphasic fluid, and wherein the temperature controller 70, preferably the electronic temperature controller, the electronic pressure monitor, and the volume controller 24, preferably electronic volume controller, are configured to determine the temperature value, the pressure value and the volume value of the expandable cell 20 when the bubble point occurs.

System according to the invention can also comprise controllers configured to identify the instant when the bubble point occurs.

Such an expandable cell 20 can preferably be a high-pressure expandable cell. Indeed, this expandable cell should be configured to sustain pressure of more than 100 bar, and up to 1000 bars. For example, the expandable cell 20 can be a high-pressure syringe.

As illustrated in FIG. 1, a system according to the invention also comprises an expansion cell 40 and a second valve 41.

The second valve 41 being arranged so as to control the flow of the gas phase to the expansion cell 40.

As mentioned, the expansion cell 40 is part of a low-pressure part configured to induce an expansion of the gaseous subsample.

The expansion cell 40 is preferably arranged so as to contain at least a fraction of the gas phase formed from the monophasic fluid 2, named the gaseous subsample 2*b* of the monophasic fluid 2.

The low-pressure part will in particular comprise the expansion cell 40. This low-pressure part is configured to induce an expansion of the gaseous subsample and thus reducing the pressure of this gaseous subsample under controlled conditions (e.g., a defined volume of the expansion cell 40).

The expansion cell 40 is preferably a high-pressure expansion cell 40. For example, this expansion cell 40 should be configured to sustain pressure between $10^{-7}$ mbar and 1000 bar.

Figure 2:
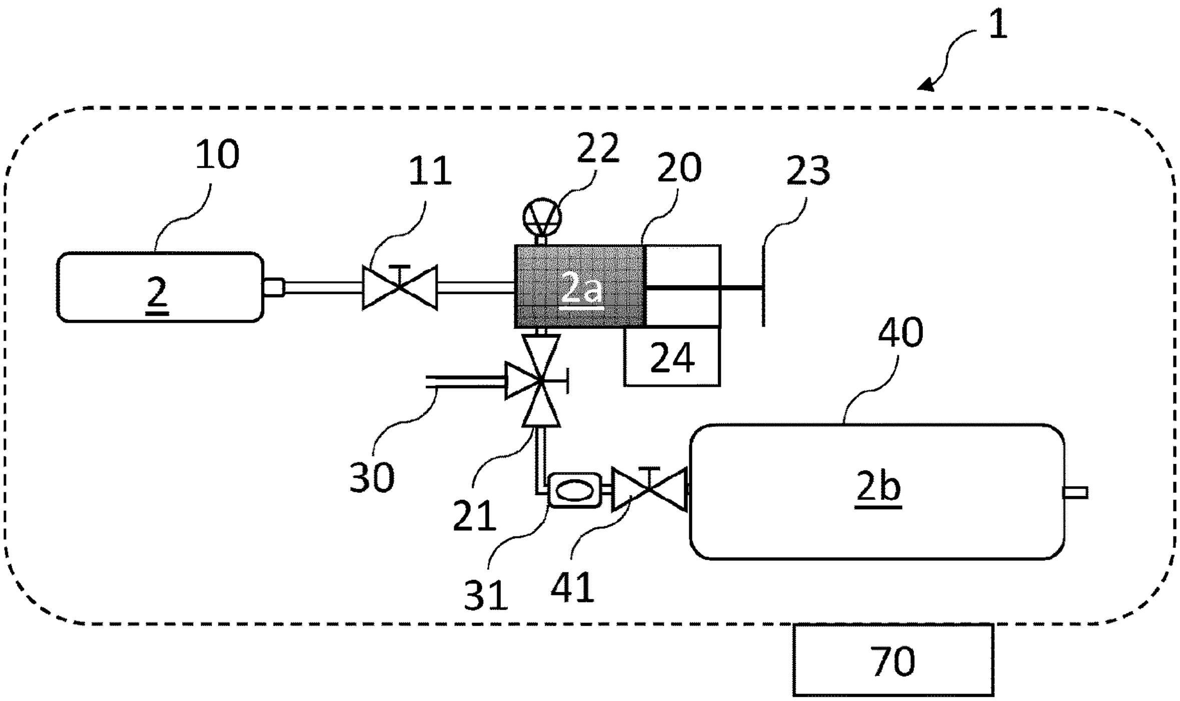
FIG. 2 is a schematic view showing an embodiment of a subsampling system of a monophasic fluid according to the invention.

As shown in FIG. 2, the subsampling system 1 can be thermoregulated. In particular, the system can comprise a temperature controller 70, preferably electronic, for temperature control of the expandable cell 20, preferably said electronic temperature controller 70 is configured to maintain a temperature of 40° C. to 60° C. in the expandable cell 20.

Figure 3:
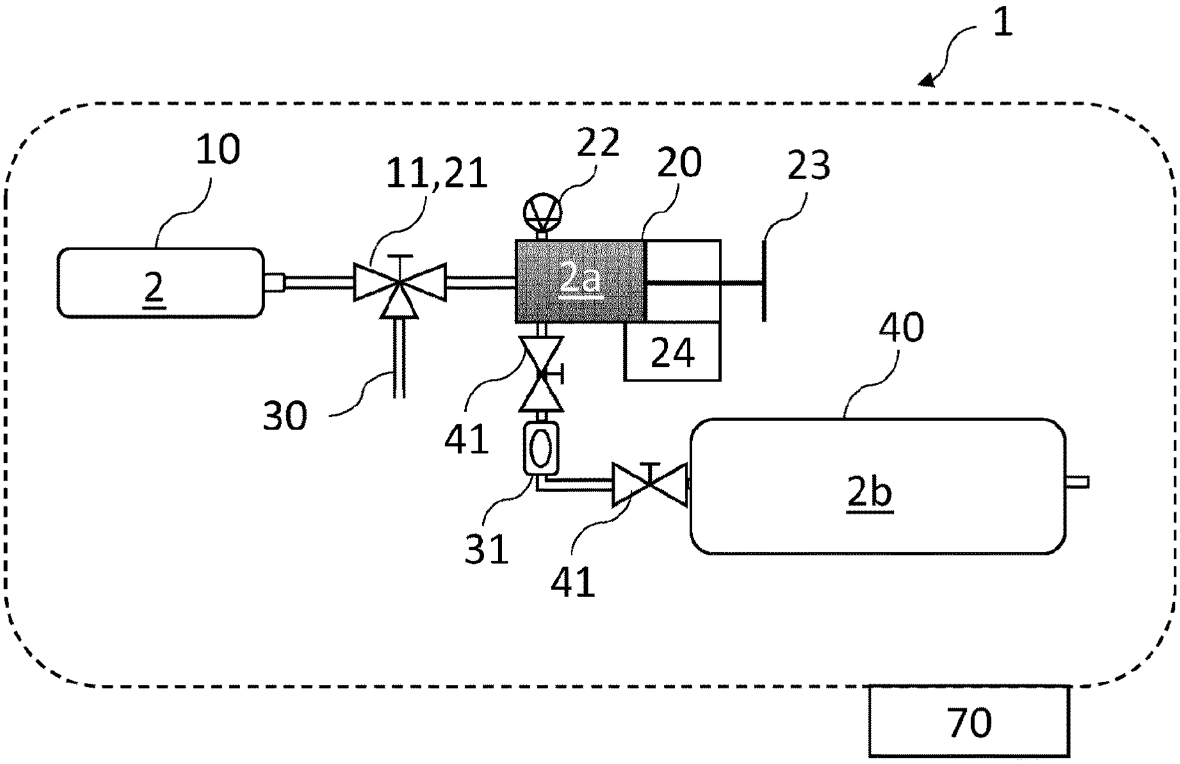
FIG. 3 is a schematic view showing an embodiment of a subsampling system of a monophasic fluid, comprising a draining point and an observation cell, according to the invention.
Figure 4:
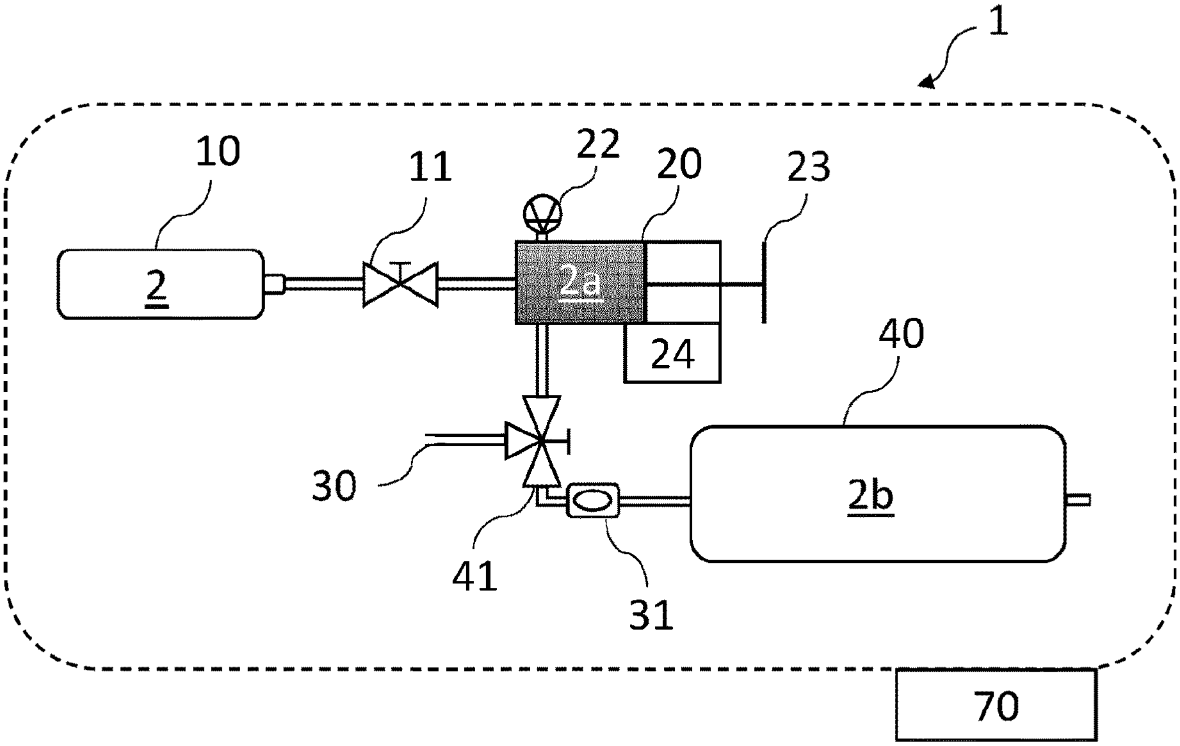
FIG. 4 is a schematic view showing an embodiment of a subsampling system of a monophasic fluid, comprising a draining point and an observation cell, according to the invention.
Figure 5:
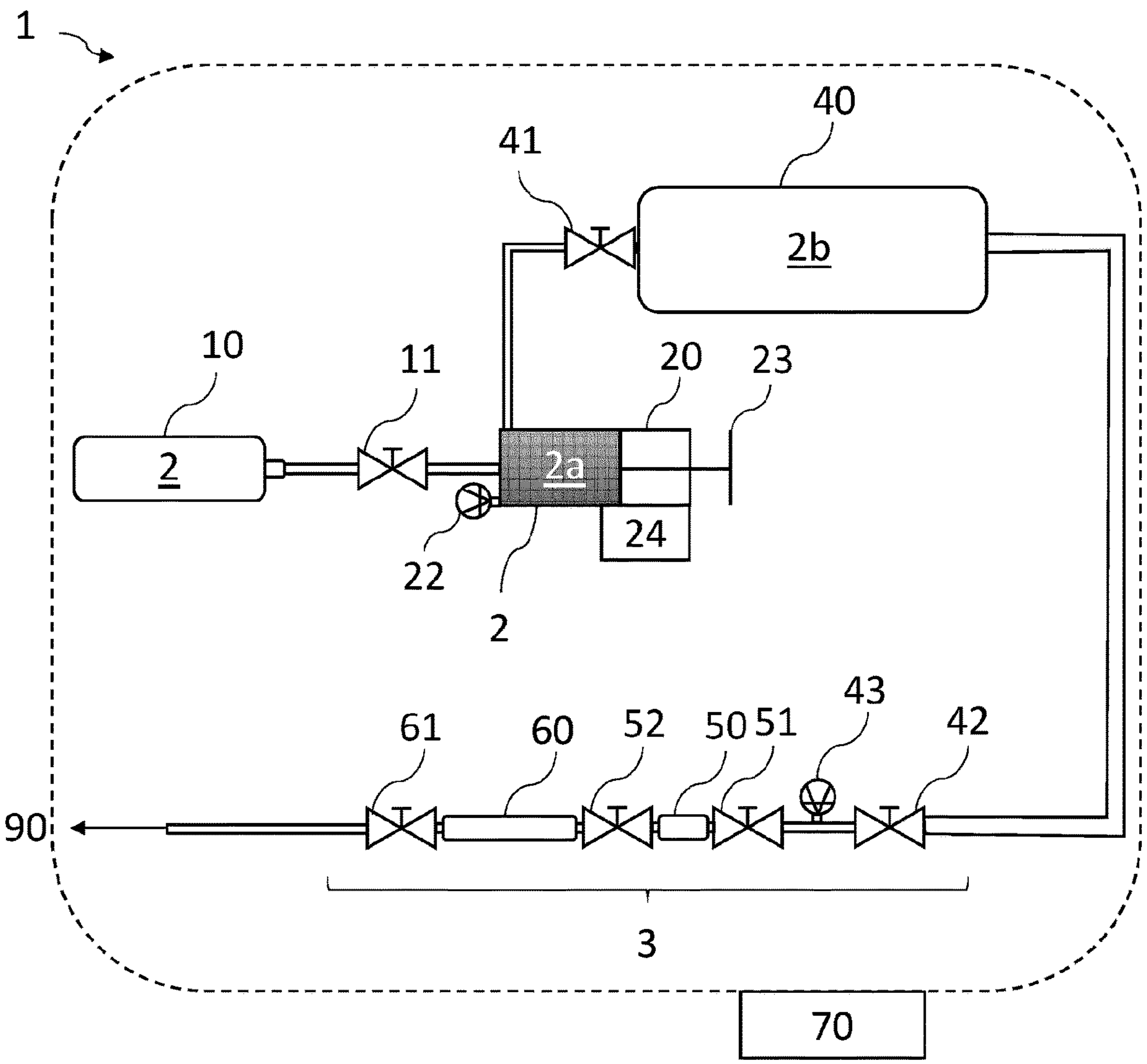
FIG. 5 is a schematic view showing an embodiment of a subsampling system of a monophasic fluid, comprising a low-pressure section, according to the invention.
Figure 6:
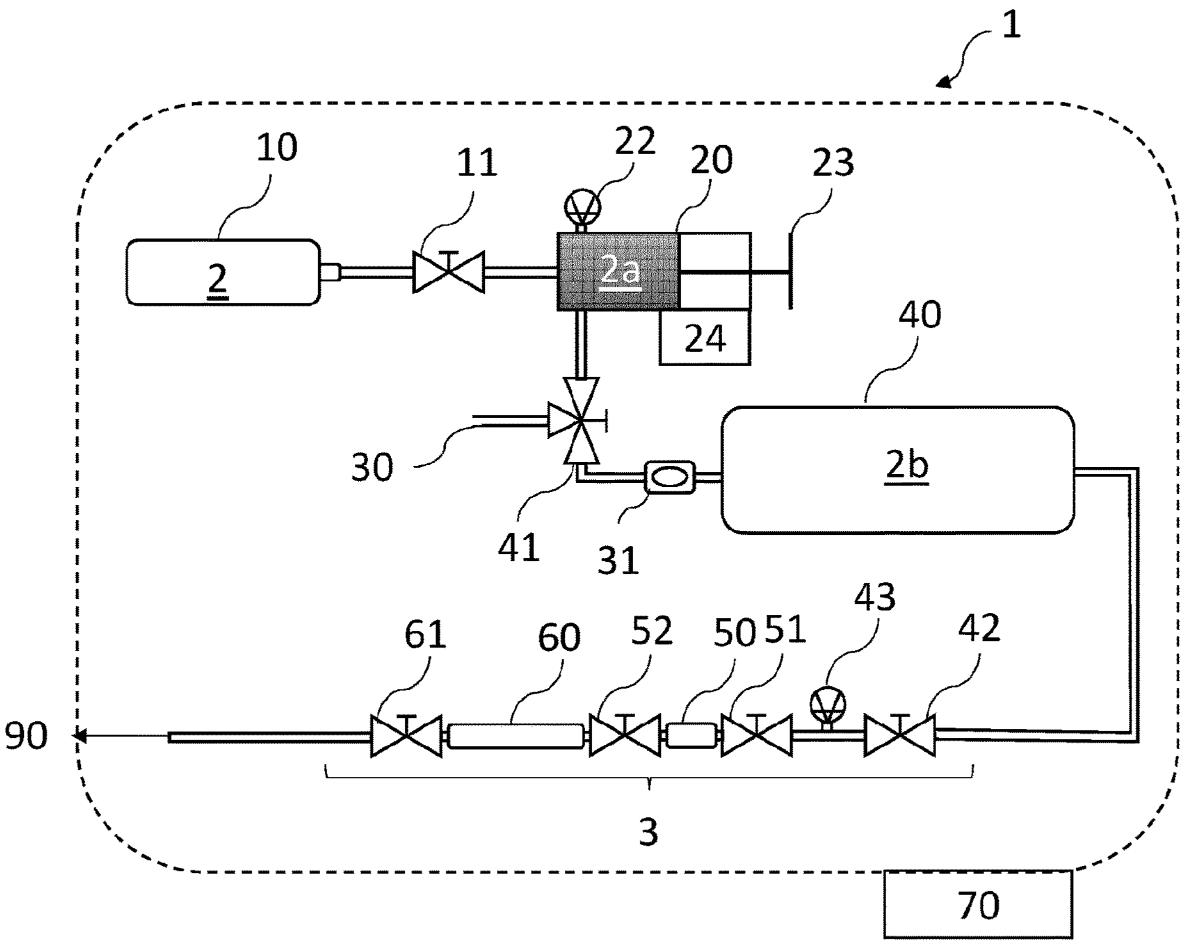
FIG. 6 is a schematic view showing an embodiment of a subsampling system of a monophasic fluid, comprising a draining point, an observation cell and a low-pressure section, according to the invention.
Figure 7:
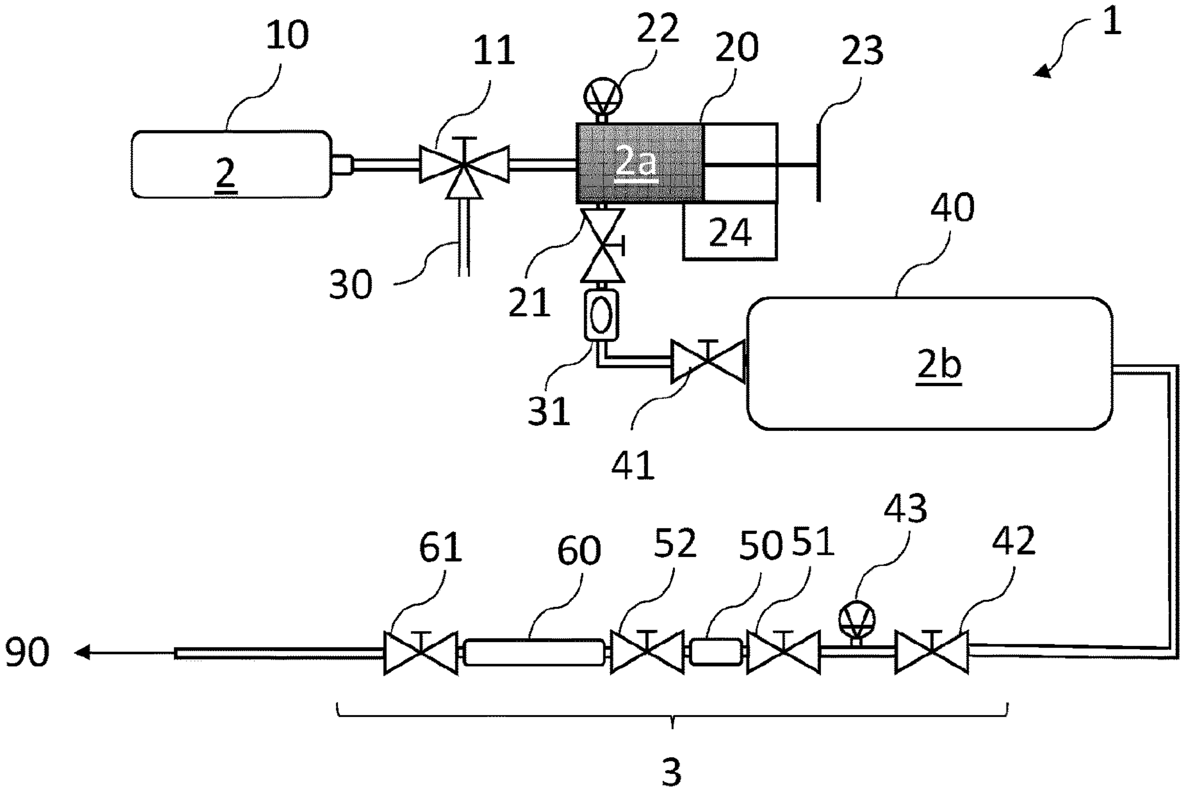
FIG. 7 is a schematic view showing an embodiment of a subsampling system of a monophasic fluid, comprising a draining point, an observation cell and a low-pressure section, according to the invention.

As illustrated in FIGS. 2, 3 and 4 a system according to the invention can comprise a draining point 30.

This draining point 30 can be used to discard part of the monophasic fluid 2 or of the liquid phase after its entry in the expandable cell 20 or the expansion cell 40.

This draining point 30 can be coupled with at least one three-way valve 21, said at least one three-way valve 21 being connected to the draining point and positioned right after (FIG. 2) and/or right before (FIG. 3) the expandable cell 20.

The system can also comprise an observation cell 31. Such an observation cell 31 can be positioned between the expandable cell 20 and the high-pressure expansion cell 40. It can be for example positioned after (FIG. 2) or before (FIG. 4) the draining points, but it has to be separated from the expandable cell with a valve.

The observation cell 31 is preferably a sapphire cell but it can also be selected from: borosilicate window or diamond cell.

The system can also comprise several pressure gauges such as thermal conductivity gauge, Pirani gauge, Penning gauge or ion gauge which are fitted onto the line for monitoring the pressure in vacuum systems.

The system can also comprise several valves. For example, the subsampling system 1 can comprise a further a three-way valve 21, said three-way valve being positioned between the second valve 41 and the high-pressure expansion cell 40.

As illustrated in FIGS. 5, 6, 7 and 8, a subsampling system according to the invention can comprise a low-pressure section 3.

Such low-pressure section 3 can for example be arranged to allow the gas pressure to reach a target pressure, preferably said target pressure being selected from 1 to 10 bars.

The system according to the invention, and in particular the low-pressure section, comprises subsampling cells 50, 60. The low-pressure section can also comprise a dedicated pressure gauge 43.

In particular, the system 1 according to the invention can comprise at least one, preferably two, subsampling cells 50, 60 arranged so as to collect at least part of the gaseous subsample at a pressure comprised between 1 bar and 10 bars.

The subsampling cells 50, 60 can also be removably fixed to the subsampling system 1. Hence the subsampling cells 50, 60 are arranged so as to be dissociated from subsampling system 1 and to be transportable.

Hence, the system according to the invention can be installed at the site of sampling of the monophasic fluid 2 and the subsampling cells are transported as such to extraction/purification line connected to a spectrometer. Alternatively, the system according to the invention can be installed in a laboratory and the system can be automated to directly inject the subsample in the extraction/purification line connected to a spectrometer.

Optionally the system 1 can comprise a reservoir tank which allows subsample aliquots to be easily stored into the system. The previously 'prepared' gases stored in the tank can be used for analyses by automated operation in the system. Therefore, those 'stored' gases make it possible to run overnight measurements automatically.

Optionally, the purification line can comprise purification means such as Ti-sponge furnace or Getter pump or cadmium acetate microporous media or silver wool porous media or zeolites or SAES GP 50 or active charcoal. Such purification means can be of particular interest when the monophasic fluid can comprise $H_2S$ to be removed before storage. It should be understood that analytical means for noble gas analysis such as mass-spectrometer can also comprise purification line.

The system may also comprise at least one turbo pump 90 configured to allow subsampling under high vacuum conditions.

In another aspect, the invention relates to a subsampling method 100 of a monophasic fluid 2.

Such a method allows obtaining a gaseous subsample 2*b* from a monophasic sample, preferably a liquid sample.

A method according to the invention can use a system 1 according to the invention. However, it can also use any system comprising a first inlet valve 11, an expandable cell 20, a second valve 41, and an expansion cell 40. In particular, the system used by a method according to the invention can comprise an expandable cell 20 being connected though a three-way valve 21 to an expansion cell 40 and a draining point 30, the first inlet valve 11 being arranged so as to receive the monophasic fluid 2 from a sampling bottle 10; and said expandable cell 20 being thermoregulated and equipped with a pressure gauge 22, said expansion cell 40 being arranged to receive the subsample for the noble gas analysis.

A method according to the invention will preferably comprise phase split step that will make the initial monophasic fluid 2 turn into a diphasic fluid under equilibrium and an expansion step that will allow the gas pressure of the gaseous subsample to reach the target pressure (e.g., 1-10 bars).

Figure 9:
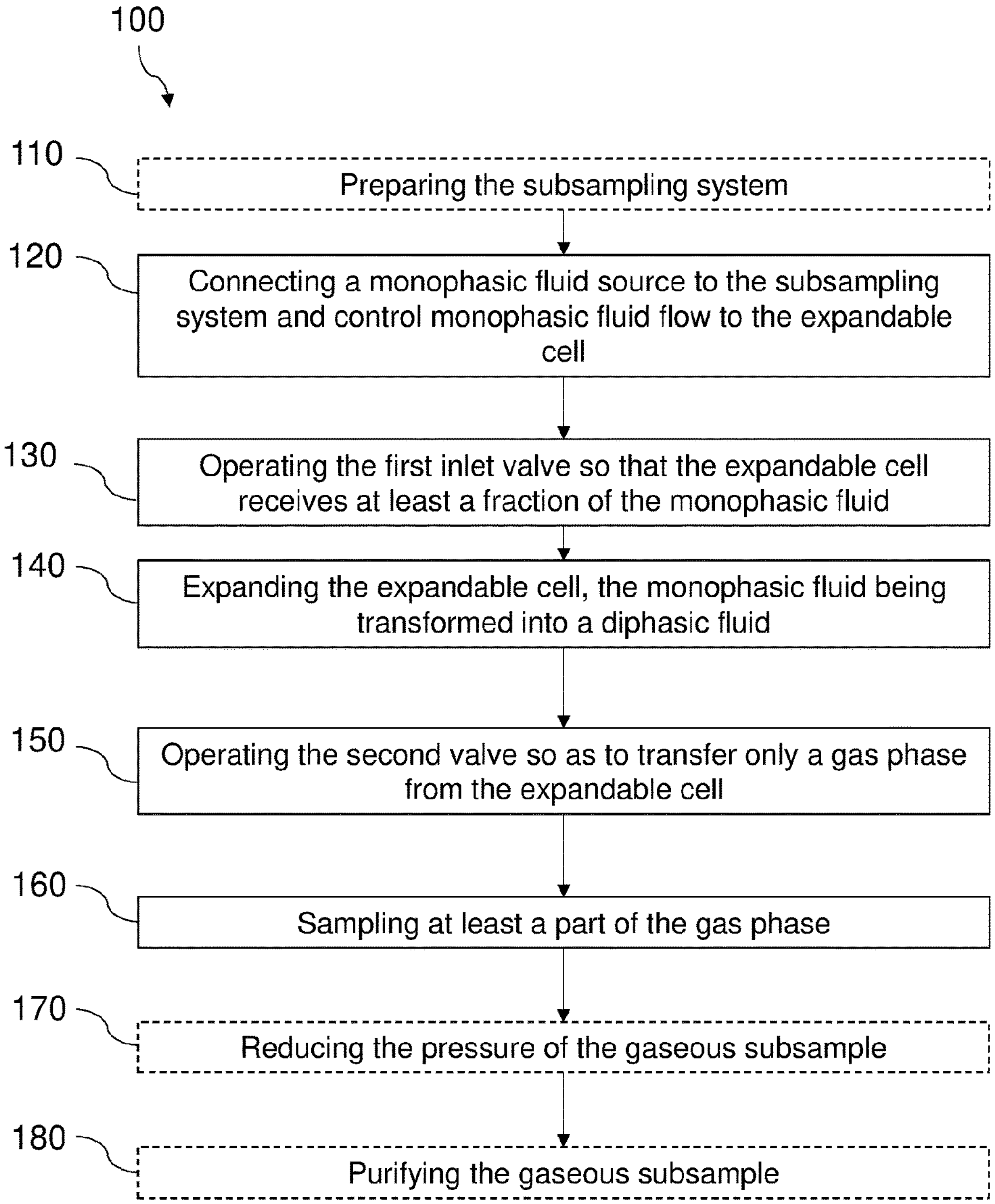
FIG. 9 is a schematic view showing a subsampling method of a monophasic fluid, for the preparation of a gaseous subsample according to an embodiment of the invention. Facultative steps are represented in dotted frames.

As illustrated in FIG. 9, the subsampling method 100 according to the invention, comprise the step of connecting 120 a monophasic fluid source to the subsampling system 1, Operating 130 the first inlet valve 11; Expanding 140 the expandable cell 20 to obtain a diphasic fluid; Transferring 150 at least a part of the gas phase from the expandable cell 20 to the high-pressure expansion cell 40; and Sampling 160 the gas phase comprised in the high-pressure expansion cell 40 to obtain the gaseous subsample 2*b*.

Moreover, a method according to the invention can comprise a step of preparing 110 the system to the subsampling, a step of reducing 170 the pressure of the gaseous subsample and a step of purifying 180 the gaseous subsample.

A first step can relate to preparing 110 the system to the subsampling. The method is particularly suited for noble gas sampling and the main source of noble gas is the air. Indeed, with the exception of helium the noble gases are many orders of magnitude lower in liquid samples than in air. Hence, the subsampling process must avoid any dead volume (not pumped) and reach a secondary vacuum ($10^{-7}$-$10^{-5}$ mbar under pumping).

Before subsampling, the system and in particular the low-pressure section should be pumped. During flushing, temperature and electrical conductivity should be checked to see if the values stabilize.

The method according to the invention is particularly advantageous for samples taken in from extreme environment such as downhole samples. The monophasic fluid 2 has preferably a pressure range from 100 to 1000 bars.

A step relates to connecting 120 a monophasic fluid source to the subsampling system 1. Such a connection is preferably made so that the first inlet valve 11 of said subsampling system 1 receives the monophasic fluid 2 and control monophasic fluid 2 flow to the expandable cell 20.

As described, the monophasic fluid source can be a bottle specifically dedicated to high-pressure collection or any other means adapted for monophasic sample collection from extreme conditions.

The method also comprises a step of operating 130 the first inlet valve 11 so that the expandable cell 20 receives, through the first inlet valve 11, at least a part of the monophasic fluid 2. Operating the first inlet valve 11 can be automatic or manual.

Advantageously, the transfer of the monophasic fluid 2 from the monophasic fluid source 10 to the expandable cell 20 is an isobar transfer. More preferably, transfer is done so as the pressure in the monophasic fluid source vary of less than 5 percent, preferably less than 1 percent.

Typically, the first inlet valve 11 will be open in order to transfer a small aliquot of the monophasic fluid 2 into the expandable cell 20. Preferably, the operating step will allow a transfer of the monophasic fluid 2 from the monophasic fluid source 10 to the expandable cell 20, said transfer corresponding for example to 1 cc. However, a higher volume of the monophasic fluid 2 can be transfer from the monophasic fluid source 10 to the expandable cell 20, such as more that 1cc, more than 2 cc or more than 5 cc.

Moreover, when the aliquot is taken, the monophasic fluid source, such as a PVT bottle, can be controlled in pressure and temperature.

The method also comprises a step of expanding 140 the expandable cell 20. In particular, it refers to the expansion of the inner volume of the expandable cell 20. The expansion is done preferably at a known pressure, volume and temperature.

With an increase of the internal volume of the expandable cell, the pressure of the monophasic fluid 2 is preferably decreased at a controlled rate until a bubble point is reached. At the instant of the bubble point, the monophasic fluid 2 is transformed into a diphasic fluid 2*a*, said diphasic fluid 2*a* comprising a gas phase and a liquid phase.

The method of the invention will preferably comprise a monitoring of how gas evolves from oil when pressure falls below the bubble point, this method is comparable to CCE (Constant Composition Expansion), also called CME (Constant Mass Expansion). This method is already known by the person of the art and is described for example in Danesh, A. (1998). "PVT and phase behaviour of petroleum reservoir fluids", Elsevier.

Hence, the expansion of the expandable cell 20 is preferably done at a rate slower than 0.5 cc per minute.

Hence, the monophasic fluid 2 will be able to support another round of expansion in order to reach it bubble point.

As the sample of expanded monophasic fluid 2 is measured as well as the pressure and the volume of the expandable cell 20, a second or third expansion can be done without losing the benefits of the present invention.

Advantageously, while the fluid is expanded into the expandable cell 20 volume, the method according to the invention comprises the recording of pressure, temperature and volume values in order to perform a pressure-volume curve (PV curve).

The method also comprises a step of operating 150 the second valve 41.

Said second valve 41 controlling the gas phase flow to the expansion cell 40, so as to transfer only the gas phase from the expandable cell 20 to the expansion cell 40, preferably the high-pressure expansion cell 40.

Finally, the method comprises a sampling 160 of the gas phase comprised in the expansion cell 40 to obtain the gaseous subsample 2*b*. Preferably, a step of sampling at least a part of the gas phase.

The gaseous subsample 2*b* will be suitable for chemical analysis and in particular for a noble gas analysis.

The method according to the invention also preferably comprises a step of maintaining a constant temperature for the whole subsampling system. Such a maintained constant temperature is preferably over 40° C., more preferably over 50° C.

EXAMPLE

A downhole sample collected at a pressure range from 100 to 1000 bars is selected as a monophasic sample. Subsampling of such a high-pressure sample is not an easy task.

However, if the samples were to be collected at the well head, the samples will be at low pressure (1-10 bar) and will be highly fractionated thought the temperature and pression variation from the downhole to the well head.

Hence, if one wants to decipher exact concentrations of chemical elements from extreme environment samples, it should subsample the monophasic fluid source in particular manners and in particular at pressure and temperature reflecting the extreme environment.

Figure 8:
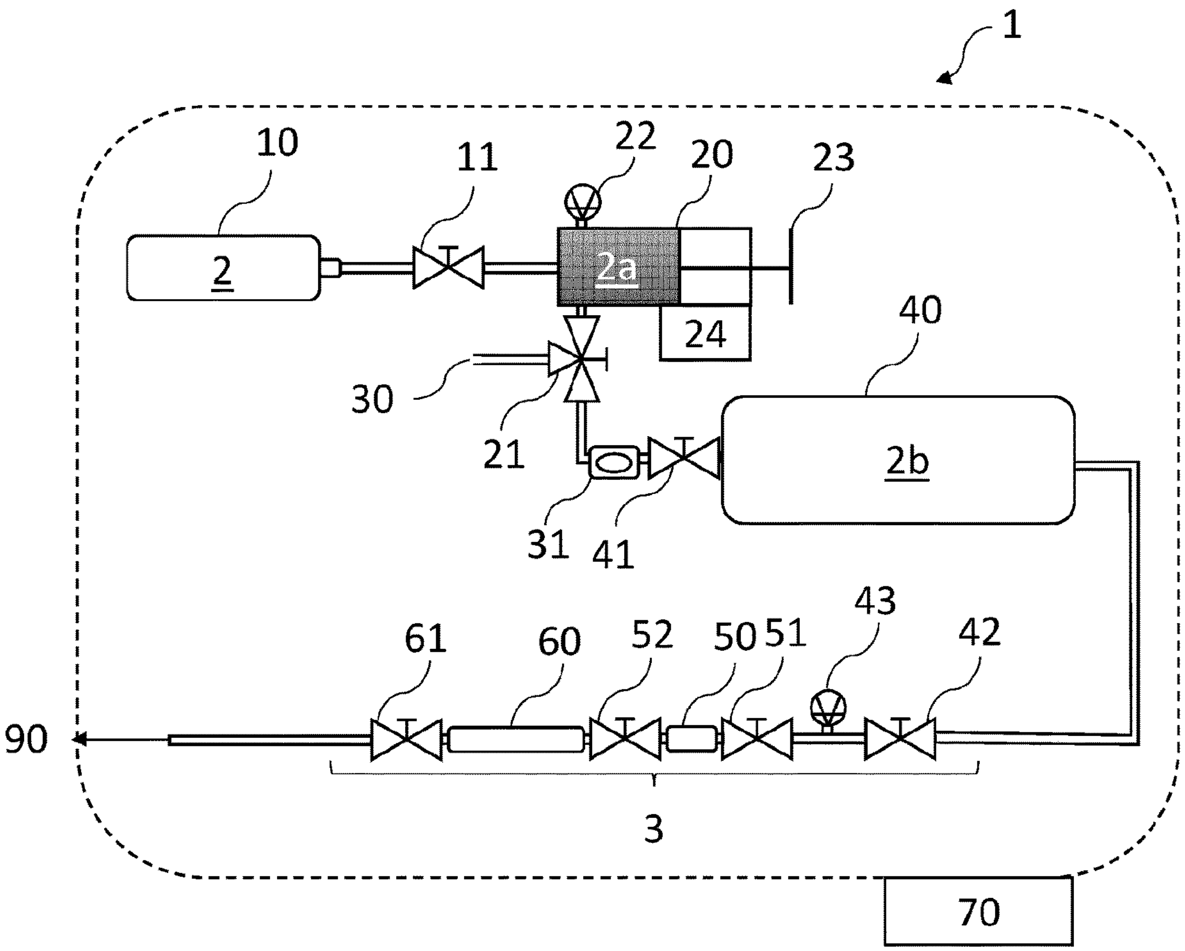
FIG. 8 is a schematic view showing an embodiment of a subsampling system of a monophasic fluid, comprising a draining point, an observation cell, a three-way-vale, and a low-pressure section, according to the invention.

Regarding the FIG. 8, at the beginning of the process, the valves 11 should be closed, and valves 21, 42, 51, 52 and 61 opened, (Valve 21 is opened to connect volumes 20 to 40, but is closed to the draining point). A turbomolecular pumping system is connected to the valve 61 and the whole system is pumped under high vacuum. The expandable cell 20 is adjusted to its minimum volume. Once the whole system under high vacuum, the valve 21 is closed.

The valve 11 is open in order to transfer an aliquot of the monophasic fluid source to the expandable cell 20. In particular, a 1cc capillary can be maintained at reservoir pressure and reservoir temperature between the PVT bottle and the expandable cell 20. The 1cc capillary is filled with the monophasic fluid 2 and then isolated from the PVT bottle to avoid any risk of damaging the fluid integrity.

The expandable cell 20 volume is adjusted gradually to the bubble point of the monophasic fluid 2. In particular, the fluid is expanded into the syringe volume. At this stage, if the bubble point pressure is unknown, a PV curve is advantageously performed to characterize it. The syringe volume is increased to up to its maximum (e.g. 30cc). The pressure can be below the bubble point pressure meaning the fluid became diphasic.

If the expandable cell 20 is adjusted to its maximum volume and the bubble point did not occur, the pressure was not low enough to reach the bubble point.

The valves 11 and/or 21 can be opened while access to the monophasic fluid source is closed. The expandable cell 20 is retracted while the expanded monophasic fluid 2 is removed.

Once the expandable cell 20 has been retracted to its minimum volume, and the whole system is pumped until $10^{-5}$ to $10^{-6}$ mbar, the "residual fluid" is expended one more time into the syringe.

Finally, the expanded monophasic fluid 2 is introduced in the expandable cell 20 and the expandable 20 volume is adjusted gradually to the bubble point of the monophasic fluid 2.

Once the monophasic fluid 2 is transformed in a diphasic fluid, the valve 21 is open to the sapphire cell. The fluid phase is checked through the sapphire cell. Valve 41 is open and only gas was transferred to the expansion cell 40.

If any drop of liquid is observed through the sapphire cell, the valve 41 is closed.

Then the gas phase from the monophasic fluid 2 is allowed to expand the sample into the expansion cell. The valve 41 is closed to isolate the gas phase, then while the valve 51 is closed, the valve 42 is opened to have a lecture of the pressure into the expansion cell 40.

Depending on the pressure at this stage, different gas expansions are possible to target a final pressure in the noble gas cell between 2 and 4 bars.

Composition of the gas can then be measured for example on a noble gas mass spectrometer.

The composition of the noble gas in the monophasic fluid 2 is back calculated based on the bubble conditions of the fluid, for example based on a calculated PV curve.

As it has been discussed, the solution developed by the inventors allow, through a phase split under controlled conditions and an expansion phase, reaching a pressure compatible with spectrometer to identify the initial content of the initial monophasic fluid 2, in particular in noble gas.

The invention claimed is:

1. A subsampling system of a monophasic fluid for the preparation of a gaseous subsample, said subsampling system comprising:

a first inlet valve, an expandable cell, a second valve, and an expansion cell;

said first inlet valve being arranged so as to receive the monophasic fluid, and to control a flow of the monophasic fluid to the expandable cell;

said expandable cell being thermoregulated, equipped with a pressure gauge and arranged to allow expansion of the monophasic fluid, from the first inlet valve, until forming a diphasic fluid at a pressure ranging from 100 bars to 1000 bars, the pressure, volume and temperature respectively monitored by an electronic pressure monitor, a volume controller and a temperature controller, the volume controller being configured to adjust the volume of the expandable cell until a bubble point occurs, said diphasic fluid comprising a gas phase and a liquid phase;

said second valve being arranged between the expandable cell and the expansion cell so as to control a flow of the gas phase of the diphasic fluid, from the expandable cell to the expansion cell;

said expansion cell being arranged so as to receive at least a part of the gas phase and to allow the gaseous subsample to reach a target pressure ranging from 1 bar to 10 bar, said at least a part of the gas phase forming the gaseous subsample of the monophasic fluid; and the temperature controller being arranged to allow a measurement and maintaining of a temperature inside the expandable cell.

2. The subsampling system according to claim 1, wherein it is arranged to allow a measurement of a pressure inside the expandable cell and to control an inner volume and temperature of the expandable cell.

3. The subsampling system according to claim 1, wherein the temperature controller, the electronic pressure monitor, and the volume controller are respectively configured to determine a temperature value, a pressure value and a volume value of the expandable cell when the bubble point occurs.

4. The subsampling system according to claim 1, wherein the whole subsampling system is thermoregulated.

5. The subsampling system according to claim 1, further comprising a three-way valve and a draining point, said three-way valve being connected to the draining point and positioned right before and/or right after the expandable cell.

6. The subsampling system according to claim 1, further comprising a low-pressure section arranged to allow a gas pressure to reach a target pressure selected from 1 to 10 bars.

7. The subsampling system according to claim 1, further comprising at least one subsampling cell removably fixed to the subsampling system and arranged so as to collect at least a part of the gaseous subsample at a pressure between 1 bar and 10 bars.

8. The subsampling system according to claim 6, wherein the low-pressure section comprises at least one subsampling cell removably fixed to the subsampling system and arranged so as to collect at least a part of the gaseous subsample at a pressure between 1 and 10 bars.

9. The subsampling system according to claim 3, wherein the temperature controller is configured to maintain a temperature of 40° C. to 60° C. in the expandable cell.

10. The subsampling system according to claim 3, wherein the volume controller is further configured to increase or decrease a volume of the expandable cell.

11. The subsampling system according to claim 1, wherein the expandable cell is equipped with a movable inner surface, said movable inner surface being arranged to increase or decrease a volume of the expandable cell.

12. The subsampling system according to claim 1, further comprising an observation cell positioned between the expandable cell and the expansion cell.

13. A method of subsampling a monophasic fluid, for the preparation of a gaseous subsample using a subsampling system comprising a first inlet valve, an expandable cell, a second valve, and an expansion cell, the subsampling system being arranged to allow a measurement of a temperature inside the expandable cell; said subsampling method comprising:

Connecting a monophasic fluid source to the subsampling system so that the first inlet valve of said subsampling system receives the monophasic fluid and controls monophasic fluid flow to the expandable cell;

Operating the first inlet valve so that the expandable cell receives, through the first inlet valve, at least a fraction of the monophasic fluid;

Expanding the expandable cell until the monophasic fluid is transformed into a diphasic fluid, said diphasic fluid comprising a gas phase and a liquid phase, at a pressure ranging from 100 bars to 1000 bars, the pressure, volume and temperature respectively monitored by an electronic pressure monitor, a volume controller and a temperature controller, the volume controller being configured to adjust the volume of the expandable cell until a bubble point occurs, said temperature controller being arranged to allow a measurement and maintaining of the temperature inside the expandable cell;

Operating the second valve positioned between the expandable cell and the expansion cell, said second valve controlling a gas phase flow of the diphasic fluid, from the expandable cell to the expansion cell, so as to transfer only the gas phase from the expandable cell to the expansion cell, said expansion cell configured to allow the gaseous subsample to reach a target pressure ranging from 1 bar to 10 bars; and Sampling at least a part of the gas phase comprised in the expansion cell to obtain the gaseous subsample.

14. A subsampling method according to claim 13, wherein the gaseous subsample is brought to a pressure of less than 10 bars.

15. A subsampling method according to claim 13, wherein the subsampling system further includes a way, through a draining point, to remove the liquid part, pump only the expandable cell and recharge it with the monophasic fluid in order to cumulate gas in the expansion cell.

16. A subsampling method according to claim 13, wherein the subsampling system comprises an observation cell, and the subsampling method also comprises a step of operating the second valve until a liquid is observed through the observation cell so as to transfer only the gas phase from the expandable cell to the expansion cell.

* * * * *